United States Patent [19]
Newman, Sr. et al.

[11] Patent Number: 5,220,707
[45] Date of Patent: Jun. 22, 1993

[54] TOOL REACH EXTENDER WITH LOCKING ASSEMBLY

[75] Inventors: Robert D. Newman, Sr.; Robert D. Newman, Jr., both of Greenwood; Gary E. Wilson, Lone Jack; Keith C. Whitehead, Lake Lotawana, all of Mo.

[73] Assignee: Mr. Longarm, Inc., Greenwood, Mo.

[21] Appl. No.: 788,585

[22] Filed: Nov. 6, 1991

[51] Int. Cl.⁵ .............. A47B 95/02; A47J 45/06; B25G 1/04; F16B 7/10
[52] U.S. Cl. .................. 16/115; 15/144.4; 403/327; 403/328; 403/108
[58] Field of Search .......... 16/115; 15/114 B, 146, 15/147, 148; 403/327, 328, 329, 108

[56] References Cited
U.S. PATENT DOCUMENTS

| | | | |
|---|---|---|---|
| 1,484,379 | 2/1924 | Rainey | 403/327 |
| 2,818,290 | 12/1957 | Harocopo | 403/108 |
| 4,409,866 | 10/1983 | McBride | 16/115 |

FOREIGN PATENT DOCUMENTS

| | | | |
|---|---|---|---|
| 3046286 | 7/1982 | Fed. Rep. of Germany | 16/115 |
| 735255 | 8/1955 | United Kingdom | 15/144 B |

*Primary Examiner*—John Sipos
*Assistant Examiner*—Carmine Cuda
*Attorney, Agent, or Firm*—Hovey, Williams, Timmons & Collins

[57] ABSTRACT

A tool reach extender includes a pair of elongated, telescopically coupled, first and second, extension members and a locking assembly for releasably locking the members in a selected position. The second member is slidably received within the first member and also includes a locking hole defined therein. The preferred locking assembly includes a tubular housing coaxially mounted to the first member supporting a transversely shiftable locking pin for receipt in the locking hole for locking the members in a selected relative position.

17 Claims, 2 Drawing Sheets

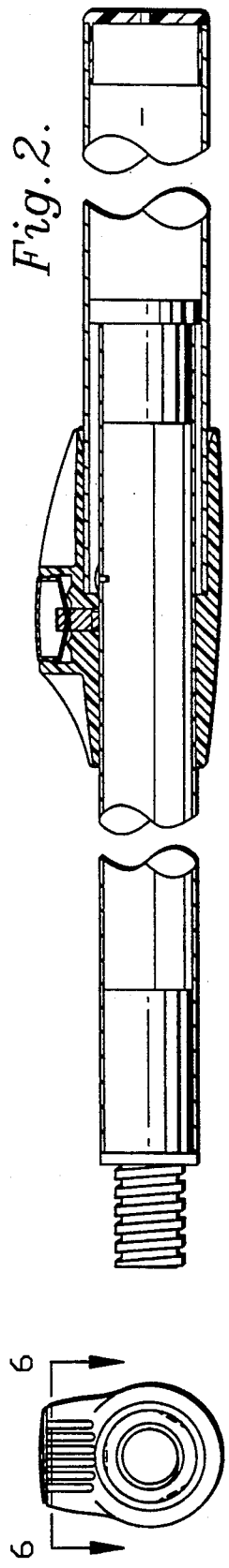
Fig. 2.
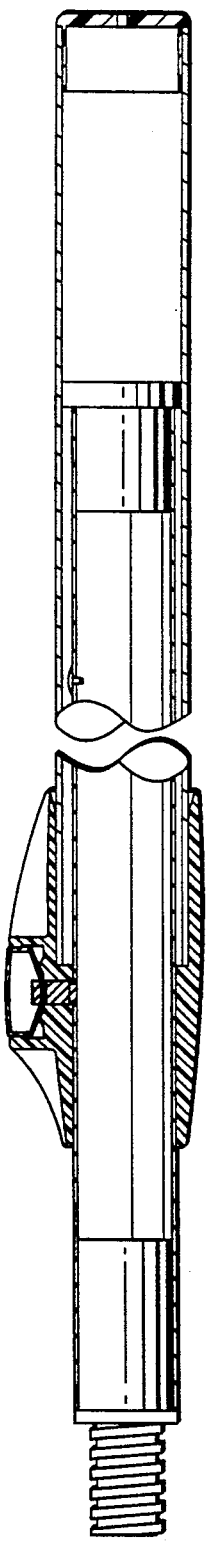
Fig. 3.
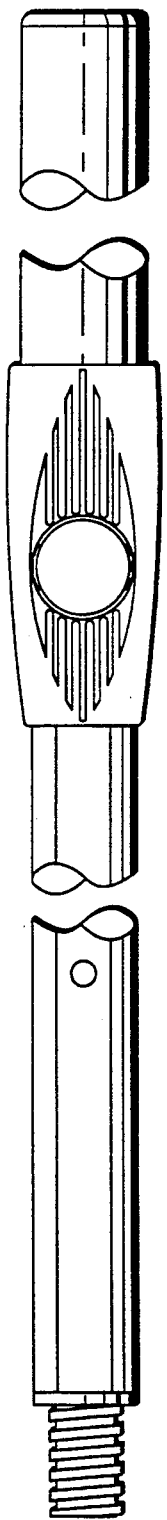
Fig. 4.
Fig. 5.
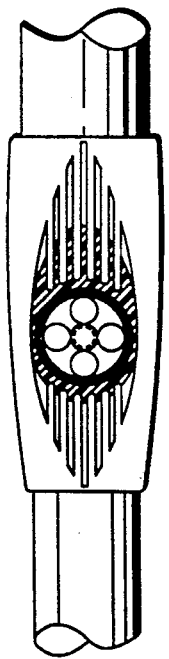
Fig. 6.

TOOL REACH EXTENDER WITH LOCKING ASSEMBLY

BACKGROUND OF THE INVENTION

1. Field of the Invention

The present invention is concerned with the field of tools. More particularly, the invention pertains to a tool reach extender including a pair of elongated, telescopically coupled, first and second, extension members and a locking assembly for releasably locking the members in a selected position.

2. Description of the Prior Art

Tool extenders are used to extend the reach of a user for the application of a tool such as a paint roller or mop to a hard-to-reach location such as a ceiling or upper portion of a wall. In the prior art, interchangeable tool handles of various lengths have been used for extending the user's reach. This solution is not always practical, however, because a tool handle of the desired length may not be available.

Another prior art device includes a pair of telescopically coupled extension members with a locking body threadably coupled with the larger diameter receiving member. The user extends the length of the device to that desired and then tightens the locking body which provides a friction lock between the two members. This prior art device has some drawbacks, however, because the two members may slip if the locking body has not been tightened sufficiently, or if members have become slippery due to moisture, paint, grease or the like.

SUMMARY OF THE INVENTION

The tool extender of the present invention solves the prior art problems discussed above and provides a distinct advance in the state of the art. More particularly, the tool extender hereof allows telescopically coupled extension members to be locked in a selected relative position.

Broadly speaking, the preferred apparatus includes a pair of telescopically coupled extension members and a locking assembly which includes a housing, a transversely shiftable locking pin, biasing member for biasing the locking pin toward its locked position, and a manually operable release button for shifting the locking pin to its released position. In preferred forms, the biasing member presents a cupped washer configuration with the outer portion of the locking pin extending through a central aperture defined in the biasing member and coupled therewith. A cylindrically shaped wall of the release button engages the periphery of the concave outboard face of the biasing member and, upon the application of force thereto, shifts the biasing member to a relatively flat or slightly convex configuration thereby shifting the locking pin outwardly to release the extension members for telescopic movement.

BRIEF DESCRIPTION OF THE DRAWINGS

FIG. 2 is a side sectional view of the preferred apparatus shown in the fully extended position;

FIG. 3 is a side sectional view of the apparatus shown in a locked retracted position;

FIG. 4 is a top plan view of the apparatus;

FIG. 5 is a front elevational view of the apparatus ; and

FIG. 6 is a partial sectional view taken along line 6—6 of FIG. 5.

DETAILED DESCRIPTION OF THE PREFERRED EMBODIMENT

Figure 1:
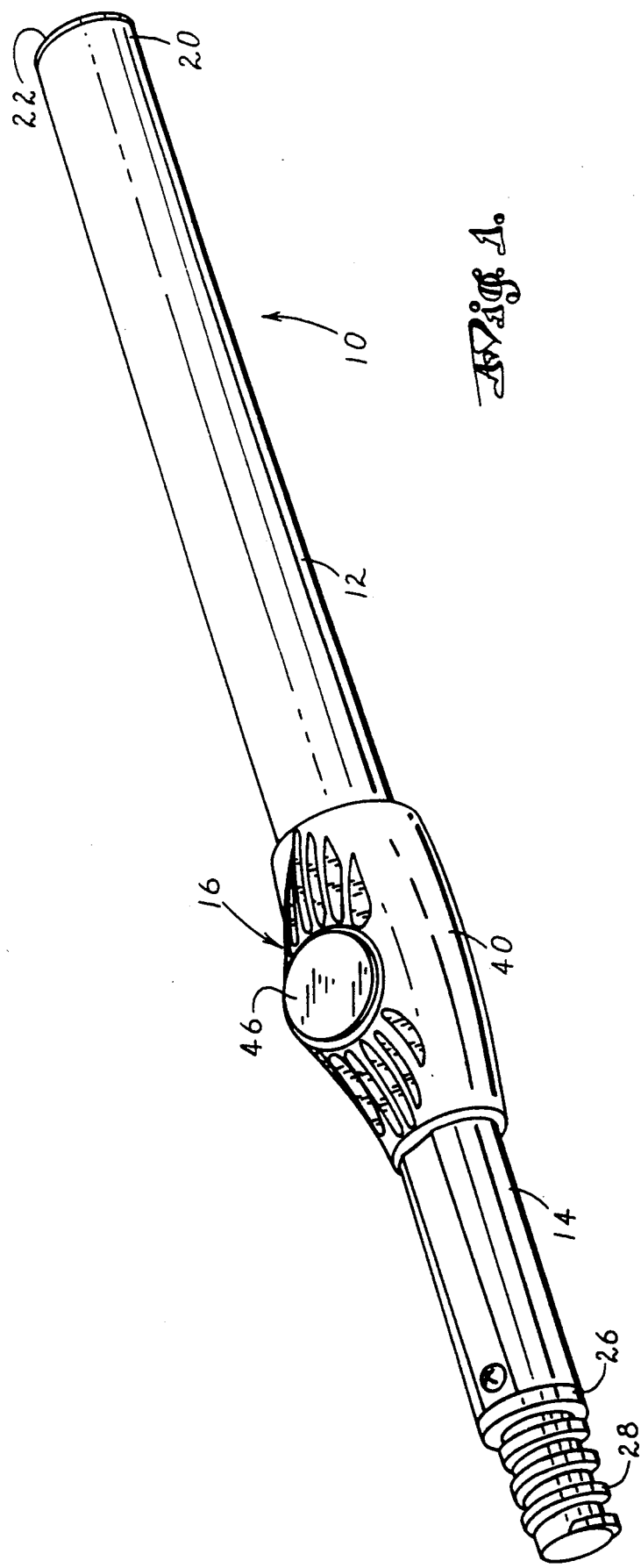
FIG. 1 is a perspective view of the preferred apparatus in accordance with the invention hereof shown in the retracted position.

Turning now the drawing figures, apparatus 10 is illustrated as the preferred embodiment of the tool reach extender of the present invention. Apparatus 10 broadly includes elongated, receiving member 12, elongated member 14 telescopically and slidably received within receiving member 12, and locking assembly 16.

Tubular, receiving member 12 is preferably composed of aluminum or synthetic resin material, presents a round cross-sectional configuration, and includes open, receiving end 18 and opposed end 20 which is enclosed by end cap 22 having vent port 24 defined therethrough. End cap 22 prevents dirt and debris from entering member 12 through end 20 while vent port 24 allows entry and exit of air during movement of slidable member 14.

Tubular member 14 also presents a circular cross-sectional configuration, and presents outer end 26 having threaded fitting 28 coaxially aligned and coupled therewith. Member 14 also includes locking hole 30 defined transversely through the tubular wall of member 14, presents inner end 32 having guide disk 34 attached thereto, and includes stop rivet 36 attached to the tubular wall of member 14 and extending outwardly therefrom.

Referring specifically to FIGS. 2 and 3, slidable member 14 presents an outside diameter less than that of the inside diameter of receiving member 12 and thereby presents a gap 38 between the two members. Stop rivet 36 extends into gap 38. Guide flange 34, however, presents an outside diameter only slightly less than the inside diameter of receiving member 12. With this configuration, flange 34 presents a slidable yet close fit within receiving member 12 and thereby aids in keeping members 12 and 14 coaxially aligned.

Locking assembly 16 includes housing 40, locking pin 42, biasing member 44, and release button 46. Housing 40 presents a generally tubular configuration with first and second opposed ends 48 and 50, and is preferably composed of synthetic resin material.

Housing 40 also presents inner surface 52 adjacent first end 48 which presents an inside diameter slightly greater than the outside diameter of slidable member 14 for presenting a slidable yet close fit in order to support member 14. Inner surface 54 is adjacent second end 50 and presents an inside diameter slightly greater than the outside diameter of receiving member 12. With this configuration, receiving member 12 is received within housing 40 and thereby coupled with locking assembly 16. The transition between surfaces 52 and 54 presents stop wall 56 which engages stop rivet 36 for preventing outward movement therebeyond in order to prevent separation of members 12 and 14.

Raised portion 58 extends outwardly from housing 40 and includes a plurality of grooves 60 defined in the surface thereof. Grooves 60 present a decorative appearance to housing 40 and also function to present a nonslip gripping surface. Raised portion 58 further includes a cylindrically shaped depression 62 defined by inner wall surface 64 and bottom wall surface 66. Locking pin receiving aperture 68 is defined through bottom wall surface 66 and through housing 40. Additionally, bottom wall surface 66 presents upstanding, circular, fulcrum ridge 70 extending around aperture 68.

Biasing member 44 is preferably composed of metal and is biased toward the configuration of a cupped washer illustrated in FIGS. 2 and 3. Member 44 presents outboard concave face 72 and inboard convex face 74 supported by fulcrum ridge 70. Additionally, pin receiving opening 76 is centrally defined through member 44 and the member walls therearound are received in an annular groove defined about the outer portion of locking pin 42. In this way, locking pin 42 is coupled with biasing member 44 and shifts therewith. Member 44 also includes four bias relief holes 78 defined therethrough and disposed equally around pin receiving opening 76. Holes 78 weaken the bias of member 44 to the desired level to permit shifting of member 44 between a locked position in which member 44 presents the cupped configuration and a released position in which member 44 assumes a relatively flat or slightly reverse convex configuration.

Release button 46 is received in depression 62 and presents an outside diameter equal to that of biasing member 44 and includes tubular wall 80 and thumb contact wall 82 enclosing one end thereof. The opposed end of wall 80 presents edge 84 which engages the periphery of convex face 72.

When button 46 is depressed, edge 84 pushes downwardly on the periphery of concave face 72 against fulcrum ridge 70 which engages convex face 74. When sufficient force is exerted to overcome the bias of member 44, it "snaps" to its released position. When pressure on button 46 is relieved, biasing member 44 returns to its locked position which in turn biases locking pin 42 toward its locked position.

When locking hole 30 and locking pin 42 come into registration during axial shifting of slidable member 14, the bias provided by biasing member 44 causes pin 42 to enter hole 30 and thereby locking member 14 in position relative to receiving member 12. When the user wishes to shift member 14, release button 46 is depressed which shifts pin 42 out of hole 30 thereby allowing movement of slidable member 14. While only one locking hole 30 is illustrated, those skilled in the art will appreciate that any number of locking holes can be defined in slidable member 14 in order to provide the desired number of locked positions.

Having thus described the preferred embodiment of the present invention the following is claimed as new and desired to be secured by Letters Patent:

1. An apparatus for extending the reach of a tool, said apparatus comprising:
   a tubular receiving member presenting an open receiving end;
   an elongated slidable member having opposed, inner and outer ends with said outer end including means for coupling with a tool, and with a portion of said slidable member including said inner end telescopically received within said receiving member through said receiving end for allowing extension and retraction of said outer end relative to said receiving member, said slidable member including structure defining a locking pin receiving hole in the surface thereof between said opposed ends; and
   locking means coupled with said receiving member for releasably locking said slidable member in a selected position relative to said receiving member, said locking means including
   a housing,
   a locking pin, including an inner portion and an outer portion, configured for reception within said locking hole and slidably supported by said housing for transverse movement therethrough relative to said slidable member, said locking pin being shiftable between a locked position in which a portion of said pin is shifted inwardly and received within said locking hole and a released position in which said pin is shifted outwardly,
   biasing means for biasing said pin towards said locked position, said biasing means including a biasing member presenting a cupped washer configuration having walls defining a central aperture, an outboard concave face presenting an outlet periphery, and an inboard convex face, said biasing member being shiftable between said cupped configuration and a relatively flat configuration, and being biased toward said cupped configuration, said locking pin inner portion being received through said aperture and coupled with said biasing member for movement therewith, and
   manually operable release means movably mounted relative both said members for engaging and pushing said periphery for flattening said biasing means and shifting said pin toward said released position.

2. The apparatus as set forth in claim 1, said biasing member being composed of metal and having a plurality of bias controlling openings defined through said faces.

3. The apparatus as set forth in claim 1, said housing presenting a tubular configuration and presenting first and second ends, said receiving end of said receiving member being received within said housing through said first end for coupling said housing and thereby said locking means with said receiving member, said slidable member being slidably received through said housing and into said receiving member.

4. The apparatus as set forth in claim 3, said receiving member presenting an inside diameter,
   said slidable member presenting an outside diameter sufficiently less than the inside diameter of said receiving member to present a gap therebetween,
   said housing including an inwardly extending body portion presenting an interior surface having inside diameter slightly greater than the outside diameter of said slidable member and presenting a stop wall adjacent said receiving end,
   said slidable member including a stop body extending from the surface thereof and into said gap adjacent said inner end for engaging said stop wall and thereby preventing outward shifting of said slidable member therebeyond.

5. The apparatus as set forth in claim 4, said slidable member further including an end flange adjacent said inner end and presenting an outside diameter slightly less than the inside diameter of said receiving member for maintaining said members in coaxial alignment.

6. The apparatus as set forth in claim 1, said members being composed of metal.

7. The apparatus as set forth in claim 7, said members being composed of aluminum.

8. The apparatus as set forth in claim 1, said housing being composed of synthetic resin material.

9. The apparatus as set forth in claim 1, said housing presenting a member support surface having an upstanding ridge configured for engaging said member concave face.

10. The apparatus as set forth in claim 1, said release means including a manually operable, shiftable button having a cylindrically shaped wall presenting an inner edge engaging said outer periphery for shifting said biasing member to said flat configuration upon the application of force to said button sufficient to overcome the bias of said member.

11. The apparatus as set forth in claim 1, said biasing member being composed of metal and having a plurality of bias controlling openings defined through said faces.

12. In an apparatus having elongated, coaxially aligned, relatively shiftable, first and second members with the first member presenting a tubular configuration slidably receiving the second member therein, a locking assembly for releasably locking the two members in a selected position, said assembly comprising:

a tubular housing coaxially coupled with said receiving member adjacent said receiving end, said second member having a locking pin hole defined therein;

a locking pin having an outer portion and having an inner portion configured for reception within said locking hole, said pin being slidably supported by said housing for transverse movement relative to said slidable member, said locking pin being shiftable between a locked position in which said inner portion of said pin is received within said locking hole and a released position in which said pin is shifted outwardly;

biasing means for biasing said pin toward said locked position, said biasing means including a biasing member presenting a cupped washer configuration having walls defining a central aperture, an outboard concave face presenting an outer periphery, and an inboard convex face, said biasing member being shiftable between said cupped configuration and a relatively flat configuration and being biased toward said cupped configuration, said locking pin inner portion being received through said aperture and coupled with said biasing member for movement therewith; and manually operable release means for shifting said pin toward said released position, said housing presenting a member support surface having an upstanding ridge configured for engaging said member concave face, said release means including a manually operable shiftable button having a cylindrically shaped wall presenting an inner edge engaging said outer periphery for shifting said biasing member against said ridge to said flat configuration upon the application of force to said button sufficient to overcome the bias of said member.

13. A locking mechanism for use in an extensible apparatus having elongated, telescopically interfitted first and second bodies each respectively presenting sidewalls, wherein the first body presents structure defining a sidewall aperture therethrough, the locking mechanism comprising:

an elongated locking member having an outer end remote from the second body sidewall, and an inner end proximal to the second body sidewall, said locking member being shiftable within the apertured structure;

a resilient biasing member having opposed edges coupled intermediate thereof with said outer end for movement therewith, said biasing member having faces defining an arcuate sheet presenting a bowed crossection which substantially flattens as said edges are compressed in order to shift said locking member;

means for compressing said edges; and a housing having a passageway that shiftably mounts the locking member with said inner end proximal to said second body for engagement thereof by said inner end extending through said aperture, and a chamber containing said biasing member, said chamber including a fulcrum ridge positioned to provide a fulcrum for said edges, said ridge assisting the flattening of said faces during edge compression.

14. The mechanism as set forth in claim 13, said means for compressing said edges including a button mounted in said chamber outwardly from said biasing member and presenting substantially planar outer wall with margins depending inwardly therefrom in dimensions sufficient to contact said edges of said biasing member.

15. The mechanism as set forth in claim 13, including said bowed structure normally exerting an inward bias upon said locking member in order to engage said locking member with said second body, and operating to disengage said locking member as said edges are compressed.

16. The mechanism as set forth in claim 13, said biasing member presenting a cupped washer configuration having concavo-convex faces, said biasing member defining a central aperture and presenting an outer periphery, said biasing member being shiftable between said cupped configuration and a relatively flat configuration, said locking member being received through said aperture and there coupled with said biasing member.

17. The apparatus as set forth in claim 16, said biasing member being composed of metal and having a plurality of bias controlling openings defined through said faces.

* * * * *